(12) United States Patent
Yamaguchi (10) Patent No.: US 12,172,414 B2
(45) Date of Patent: Dec. 24, 2024

(54) INTERIOR MATERIAL (71) Applicant: TOYOTA BOSHOKU KABUSHIKI KAISHA, Aichi (JP)

(72) Inventor: Tsuyoshi Yamaguchi, Aichi-ken (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 85 days.

(21) Appl. No.: 18/201,369

(22) Filed: May 24, 2023

(65) Prior Publication Data
US 2023/0391041 A1 Dec. 7, 2023

(30) Foreign Application Priority Data

Jun. 2, 2022 (JP) ................. 2022-090081

(51) Int. Cl.
| | |
|---|---|
| *B60Q 3/54* | (2017.01) |
| *B32B 3/04* | (2006.01) |
| *B32B 3/06* | (2006.01) |
| *B32B 3/08* | (2006.01) |
| *B32B 5/02* | (2006.01) |
| *B29D 11/00* | (2006.01) |
| *B32B 5/18* | (2006.01) |
| *B32B 5/24* | (2006.01) |
| *B60Q 3/51* | (2017.01) |
| *B60Q 3/62* | (2017.01) |

(52) U.S. Cl.
CPC .................. *B32B 3/06* (2013.01); *B32B 3/04* (2013.01); *B32B 3/08* (2013.01); *B32B 5/024* (2013.01); *B29D 11/00673* (2013.01); *B32B 5/18* (2013.01); *B32B 5/245* (2013.01); *B32B 2266/0278* (2013.01); *B32B 2605/003* (2013.01); *B60Q 3/51* (2017.02); *B60Q 3/54* (2017.02); *B60Q 3/62* (2017.02)

(58) Field of Classification Search
None
See application file for complete search history.

(56) References Cited

U.S. PATENT DOCUMENTS

| | | |
|---|---|---|
| 10,549,684 B2 | 2/2020 | Yamada et al. |
| 10,703,264 B2 | 7/2020 | Yamada |
| 2015/0274066 A1 | 10/2015 | Del Pozo Gonzalez et al. |
| 2017/0217366 A1 | 8/2017 | Kraemer et al. |
| 2017/0297484 A1 | 10/2017 | Yamada et al. |

(Continued)

FOREIGN PATENT DOCUMENTS

| | | |
|---|---|---|
| DE | 102015103541 | 10/2015 |
| DE | 102020112574 | 5/2021 |

(Continued)

OTHER PUBLICATIONS

Office Action issued in German Patent Appl. No. 102023113532.5, dated Feb. 19, 2024, along with an English translation thereof.

*Primary Examiner* — Alexander S Thomas
(74) *Attorney, Agent, or Firm* — Greenblum & Bernstein, P.L.C.

(57) ABSTRACT

The interior material includes a base material having a plate shape and a skin material covering a front surface of the base material, where the skin material has a woven fabric in which optical fibers are woven as constituent yarns. A bundle structure that collects a plurality of optical fibers exposed from the end portion of the skin material so as to lie along a back surface of the base material is provided at an end portion of the back surface of the base material.

5 Claims, 10 Drawing Sheets

(56) References Cited

U.S. PATENT DOCUMENTS

| | | |
|---|---|---|
| 2018/0339650 A1 | 11/2018 | Yamada |
| 2022/0111791 A1 | 4/2022 | Hori et al. |
| 2023/0173978 A1 | 6/2023 | Tontsch |

FOREIGN PATENT DOCUMENTS

| | | |
|---|---|---|
| JP | 2017-193200 A | 10/2017 |
| JP | 2018-140674 A | 9/2018 |
| JP | 2018-197083 A | 12/2018 |

INTERIOR MATERIAL

INCORPORATION BY REFERENCE

This application claims priority to Japanese Patent Application No. 2022-090081 filed on Jun. 2, 2022 based on U.S. Patent Law § 119, the disclosure of which is expressly incorporated herein by reference in its entirety.

BACKGROUND OF THE INVENTION

Technical Field

The present invention relates to an interior material, and more specifically to an interior material including a base material having a plate shape and a skin material covering a front surface of the base material.

Background Art

Figure 13A:
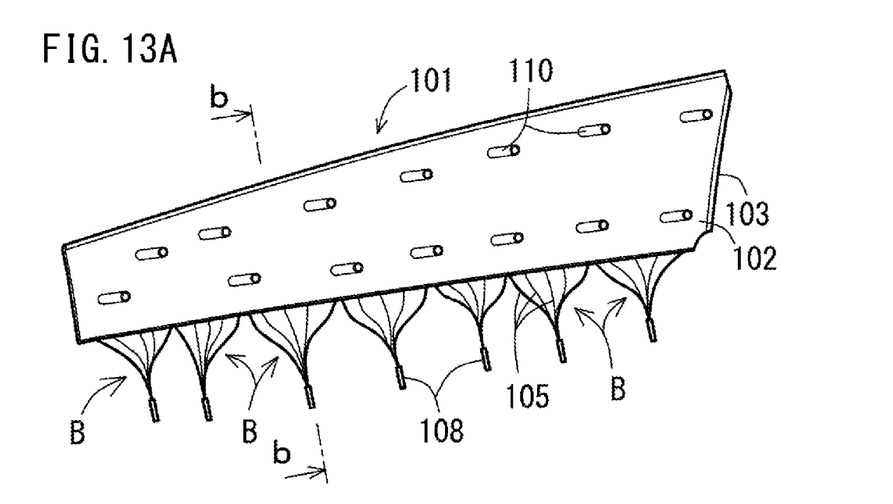
Figure 13B:
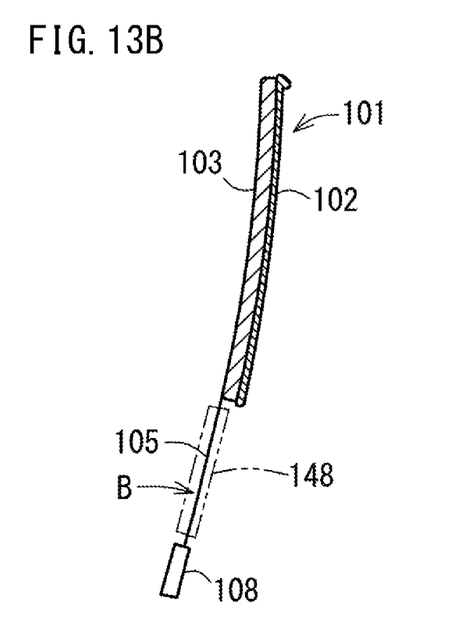

As a conventional interior material, an ornament constituting a vehicle door trim is generally known. As illustrated in FIGS. 13A and 13B, for example, the ornament 101 includes a base material 102 having a plate shape and a skin material 103 covering a front surface of the base material 102. As the skin material 103, an optical fiber skin material 103 having a woven fabric in which optical fibers are woven as constituent yarns may be adopted (see e.g., JP 2017-193200 A). In the optical fiber skin material 103, a plurality of optical fibers 105 exposed from the end portion of the skin material 103 form a rake-shaped optical fiber bundle B by binding the distal end portions thereof with a sleeve 108 or the like. When such an optical fiber skin material 103 is attached to the front surface of the base material 102, the rake-shaped optical fiber bundle B going out of the design from the end portion of the skin material 103 may hang during handling such as transportation, and the exposed optical fibers 105 may be damaged.

Figure 14A:
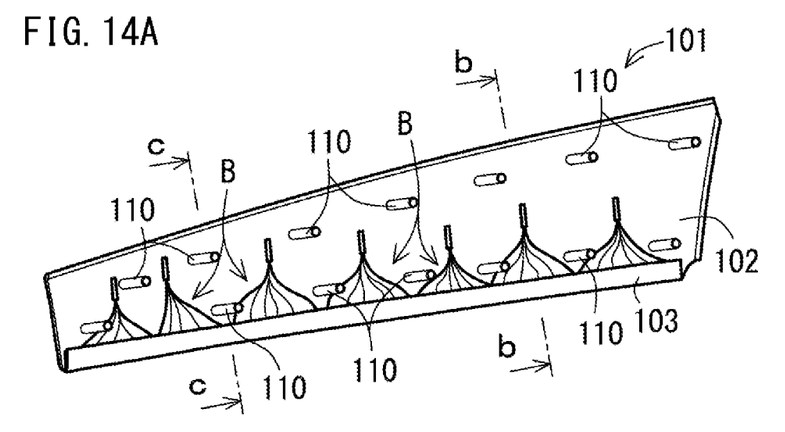
Figure 14B:
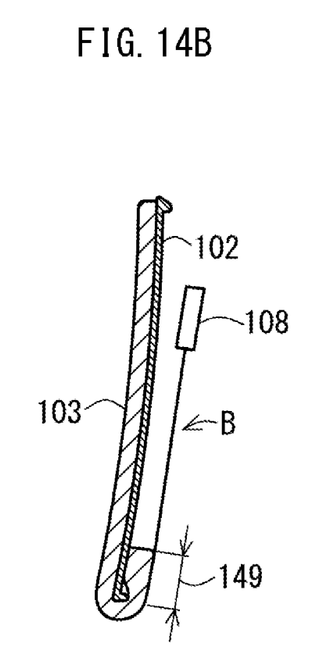
Figure 14C:
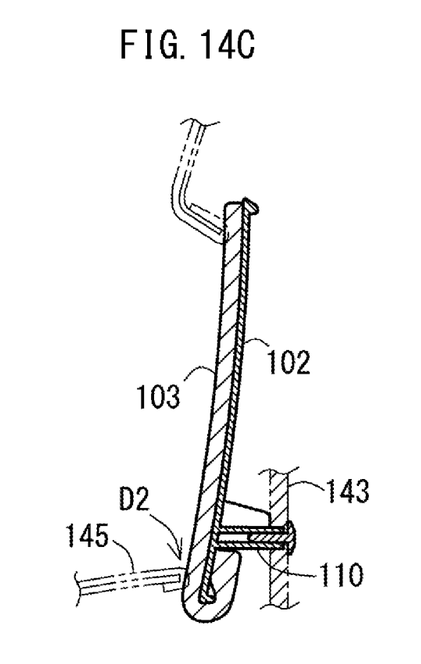

Therefore, in order to solve the above problem, for example, as illustrated by a virtual line in FIG. 13B, a countermeasure for collecting and protecting the rake-shaped optical fiber bundle B in a rope shape with a corrugate tube 148 or the like is considered. Furthermore, for example, as illustrated in FIGS. 14A to 14C, a countermeasure for fixing the rake-shaped optical fiber bundle B to some extent so as to lie along the back surface of the base material 102 by extending the end of the optical fiber skin material 103 and catching it around the back surface of the base material 102 can be considered.

However, in the former countermeasure, the corrugate tube 148 or the like needs to be set, and the production cost increases. In addition, in the latter countermeasure, since there is an allowance 149 for the optical fiber skin material 103 to be caught at the back surface of the base material 102 (e.g., about 10 to 30 mm), a fastening portion 110 with another constituting member 143 of a door trim 141 cannot be set in the attachment area of the optical fiber skin material 103 on the back surface of the base material 102 (see FIG. 14C). Furthermore, since the rake-shaped optical fiber bundle B exists on the back surface of the base material 102, the fastening portion 110 needs to be set at a position away from the rake-shaped optical fiber bundle B in consideration of the engagement of the optical fibers 105. As a result, the fastening portion 110 cannot be set on the side closer to the outer edge of the base material 102, and must be set away from a parting D2 in the design of the ornament 101 (that is, an abutment site of the other interior material 145 with respect to the design surface of the ornament 101). Note that this problem similarly occurs in an interior material in which the front surface of the base material is covered with an optical fiber skin material in addition to an ornament constituting a vehicle door trim.

JP 2018-140674 A describes a technique in which an extended portion of a skin material formed by a slush molding die is folded back to a back surface side of a base material, and a skin side locking portion provided in the extended portion is locked by a base material side locking portion provided on the back surface of the base material, but does not describe at all a technique for bringing a fastening portion closer to a parting in a design by setting the fastening portion with another member constituting an interior product on a side closer to an outer edge of the back surface of the base material.

SUMMARY OF INVENTION

An embodiment of the present invention has been made in view of the above current situation, and an object of the present invention is to provide an interior material capable of bringing a fastening portion closer to a parting in a design by setting the fastening portion with another member constituting an interior product on a side closer to an outer edge of a back surface of a base material.

The present embodiment is an interior material including a base material having a plate shape and a skin material covering a front surface of the base material, wherein the skin material has a woven fabric in which optical fibers are woven as constituent yarns, and a bundle structure that collects the plurality of optical fibers exposed from an end portion of the skin material along a back surface of the base material is provided at an end portion of the back surface of the base material.

In another embodiment, the bundle structure may have a standing wall rising on a back surface of the base material, and an insertion hole through which the plurality of optical fibers are inserted may be formed in the standing wall.

In another embodiment, the bundle structure may include a pair of standing walls rising on a back surface of the base material and facing each other, and a hook-shaped portion that inserts the plurality of optical fibers between the pair of standing walls may be provided on a distal end side of each of the pair of standing walls.

In another embodiment, a plurality of the bundle structures may be provided along at least one side portion of the base material.

In another embodiment, the interior material may be an ornament constituting a vehicle door trim.

According to the interior material of the present embodiment, the skin material has the woven fabric in which the optical fibers are woven as constituent yarns, and the bundle structure for collecting the plurality of optical fibers exposed from the end portion of the skin material so as to lie along the back surface of the base material is provided at the end portion of the back surface of the base material. As a result, the fastening portion with another member constituting the interior product can be set on the side closer to the outer edge of the back surface of the base material and can be brought close to the parting in the design.

Further, when the bundle structure has a standing wall and an insertion hole is formed in the standing wall, a plurality of optical fibers can be easily collected by being inserted into the insertion hole.

Further, when the bundle structure has a pair of standing walls, and a hook-shaped portion is provided on a distal end side of each of the pair of standing walls, a plurality of optical fibers can be easily collected by inserting the plurality of optical fibers from the hook-shaped portions between the pair of standing walls. Furthermore, the hook-shaped portions prevents the plurality of optical fibers inserted between the pair of standing walls from coming out.

Further, when a plurality of the bundle structures are provided along at least one side portion of the base material, the plurality of optical fibers exposed from the end portion of the skin material can be divided into a predetermined number and collected with each bundle structure.

BRIEF DESCRIPTION OF DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 7A to 7C are an enlarged view of a portion as viewed from arrow VII in FIG. 6, where FIG. 7A shows a form in which a standing wall and a reinforcement rib are separated from each other, and FIGS. 7B and 7C show a form in which the standing wall and the reinforcement rib are connected to each other.

FIGS. 9A and 9B are a perspective view of a bundle structure according to another form, where FIG. 9A shows a form having an elongated insertion hole, and FIG. 9B shows a form having a plurality of insertion holes.

FIGS. 10A to 10C are an explanatory view for explaining an ornament according to another form, where FIG. 10A shows a perspective view of a bundle structure, FIG. 10B shows a cross-sectional view of the bundle structure, and FIG. 10C shows a view in the direction of arrow c.

FIGS. 13A and 13B are an explanatory view for explaining a conventional ornament, where FIG. 13A shows a perspective view as viewed from a back surface of the ornament, and FIG. 13B shows an enlarged cross-sectional view taken along line b-b.

FIGS. 14A to 14C are an explanatory view for explaining a conventional ornament, where FIG. 14A shows a perspective view as viewed from a back surface of the ornament, FIG. 14B shows an enlarged cross-sectional view taken along line b-b, and FIG. 14C shows an enlarged cross-sectional view taken along line c-c.

DESCRIPTION OF EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1:
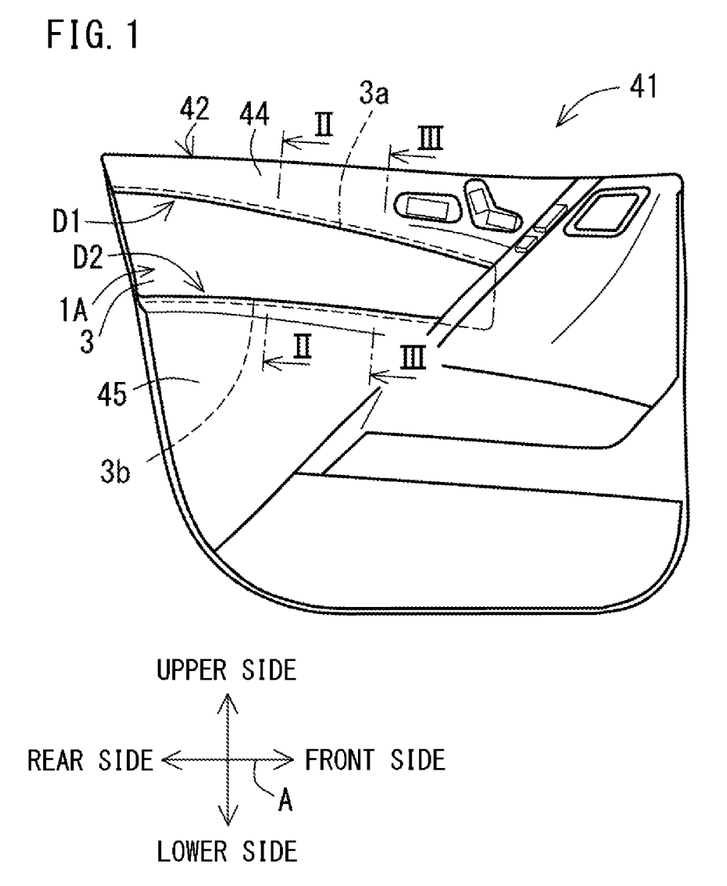
FIG. 1 is a front view of a vehicle door trim including an ornament according to an example.
Figure 2:
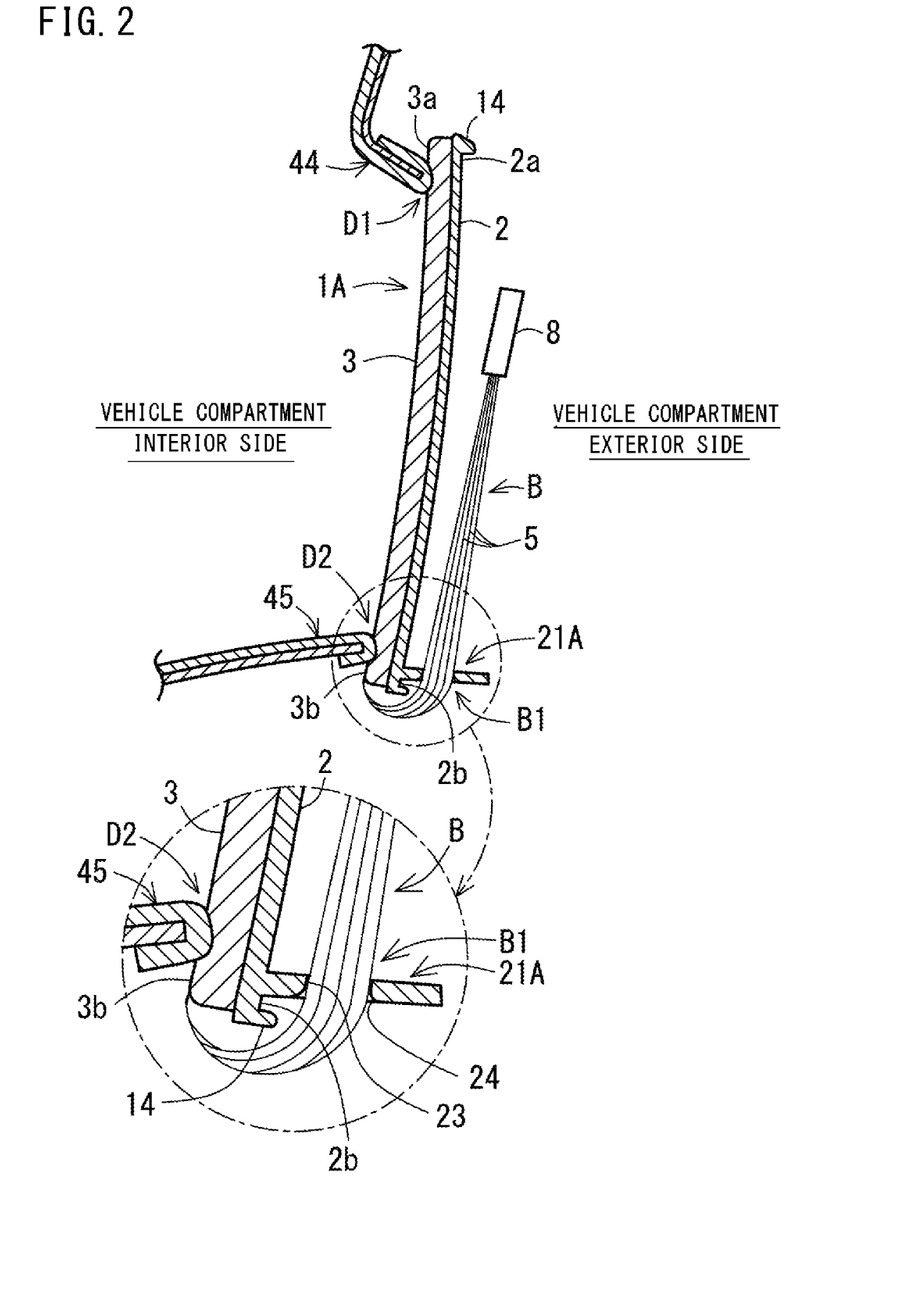
FIG. 2 is an enlarged cross-sectional view taken along line II-II in FIG. 1.
Figure 5:
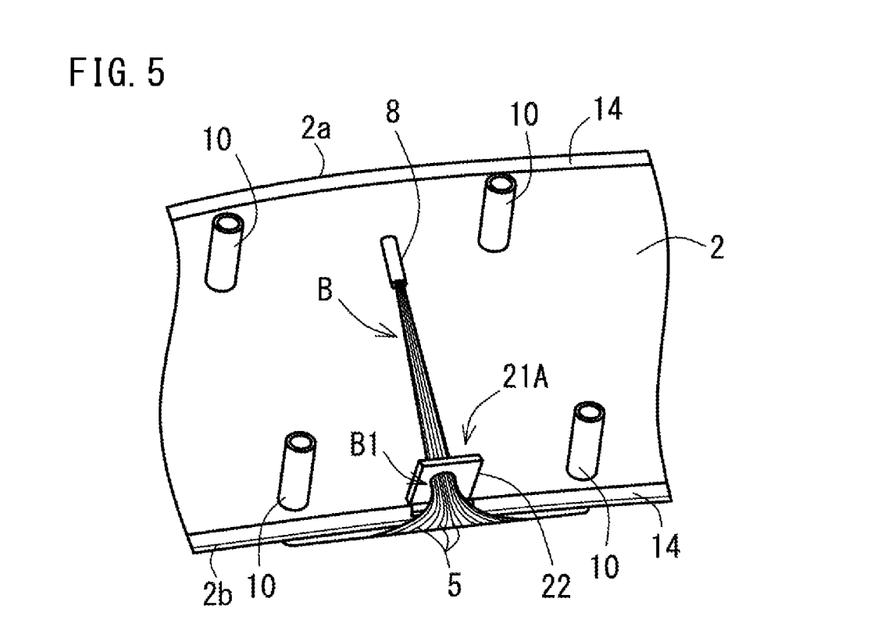
FIG. 5 is an enlarged view of a main part of FIG. 4.

As illustrated in, for example, FIGS. 2 and 5, and the like, interior materials 1A to 1C according to the present embodiment include a base material 2 having a plate shape and a skin material 3 covering a front surface of the base material 2, the skin material 3 has a woven fabric 6 in which optical fibers 5 are woven as constituent yarns, and bundle structures 21A to 21C are provided at an end portion of a back surface of the base material 2 to collect a plurality of optical fibers 5 exposed from the end portion of the skin material 3 along the back surface of the base material 2. The interior materials 1A to 1C may be members constituting an interior product 41 (see FIG. 1).

The planar shape of the base material 2 is not particularly limited. The base material 2 can be formed in, for example, a long shape. A fastening portion 10 (specifically, a fastening boss) to be fastened to the base member 43 (i.e., other members constituting the interior product 41) can be provided on the back surface of the base material 2 (see FIG. 4). The fastening portion 10 can be provided in plurals along at least one side portions 2a and 2b of the base material 2 (e.g., one side portions 2a and 2b along the long direction of the base material 2). Furthermore, the fastening form of the fastening portion 10 and the base member 43 is not particularly limited, and one type or a combination of two or more types of screw fastening, fitting fastening, fastener fastening, adhesive fastening, and the like can be appropriately selected. Specifically, the fastening portion 10 and an attachment portion 11 provided on the base member 43 can be fastened by a bis 12 (see FIG. 3). All or some of the plurality of fastening portions 10 may be provided in a region within 30 mm (particularly 20 mm) from the outer edge of the base material 2. Furthermore, on the back surface of the base material 2, a reinforcement rib 14 for preventing deformation of the base material 2 may be provided in a protruding manner along at least the one side portions 2a and 2b.

Figure 3:
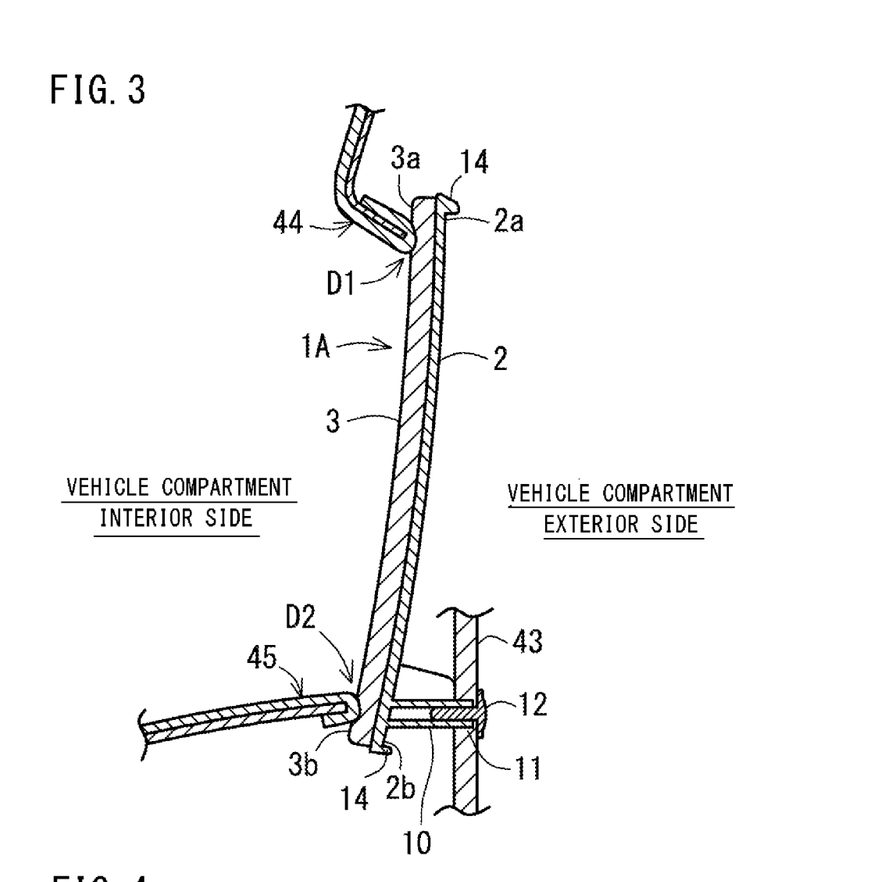
FIG. 3 is an enlarged cross-sectional view taken along line III-III in FIG. 1.

The fastening portions 10 are required to be set in the vicinity of partings D1, D2 (i.e., mating sites of the interior materials 1A to 1C and other interior materials 44 and 45; abutment sites of the other interior materials 44 and 45 with respect to the design surface of interior materials 1A to 1C) in the designs of the interior materials 1A to 1C (see FIG. 3).

The material of the base material 2 is not particularly limited. The base material 2 can contain a thermoplastic resin. Examples of the thermoplastic resin include polyolefins (particularly polypropylene), polyester, polystyrene, acrylic, polyamide, polycarbonate, polyacetal, and ABS. Only one type thereof may be used or two or more types may be used in combination. Furthermore, the base material can contain the thermoplastic resin and reinforcement fibers. As the reinforcement fibers, inorganic fibers (glass fibers, carbon fibers, etc.) or organic fibers (natural fibers such as plant fibers and animal fibers, or resin fibers such as polyester, polyamide, and aramid) can be used. Only one type thereof may be used or two or more types may be used in combination. Examples of the plant fibers include bast plant fibers (e.g., kenaf, flux, jute, hemp, ramie, and the like), leaf-vein plant fibers (e.g., abaca, sisal, agave, and the like), woodbased plant fibers (e.g., plant fibers collected from hardwood, softwood, and the like), and other plant fibers (coconut shell fiber, oil palm empty fruit bunch fiber, rice straw fiber, straw fiber, bamboo fiber, cotton, and the like). Only one type thereof may be used or two or more types may be used in combination. The material of the base member is not particularly limited. The base member can be made of the same material as the base material described above.

The skin material 3 covers all or a part of the front surface of the base material 2. The skin material 3 may or need not be adhered to the front surface of the base material 2 with an adhesive or the like. The planar shape of the skin material 3 is not particularly limited. The skin material can be formed in, for example, a long shape. Furthermore, the skin material 3 may be formed in the same planar shape as the base material 2, or may be formed in a planar shape different from the base material 2.

Figure 8:
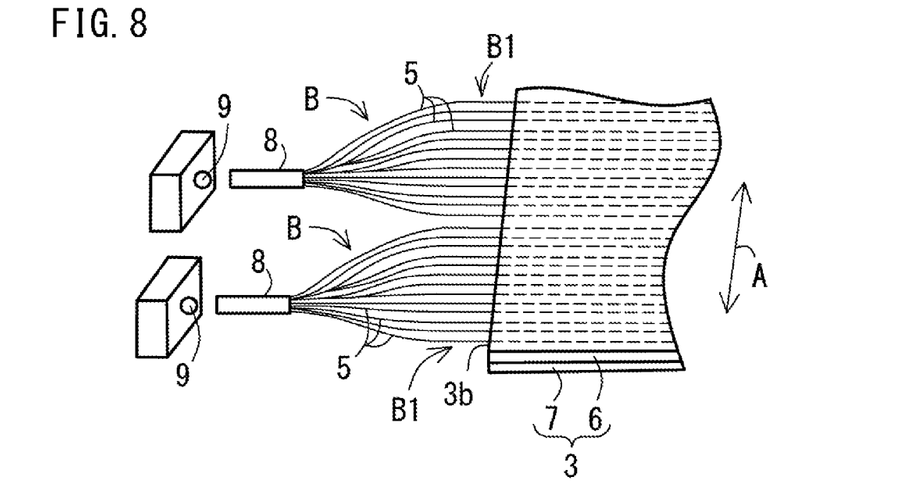
FIG. 8 is a perspective view of a skin material according to an example.

The skin material 3 has a woven fabric 6 in which optical fibers 5 are woven as constituent yarns (see FIG. 8). The plurality of optical fibers 5 are exposed (i.e., extended) from the end portion of the skin material 3 (i.e., the woven fabric 6). The distal end side of the plurality of optical fibers 5 is bound by a sleeve 8, a heat shrinkable tube, or the like, thereby forming an optical fiber bundle B. The optical fiber bundle B can be provided in plurals along at least one side portion 3b of the skin material 3 (e.g., one side portion 3b along the long direction of the skin material 3). Furthermore, the end portion of the skin material 3 connected to the optical fiber bundle B is not folded back to the back surface side of the base material 2, and can be arranged at the end portion of the front surface of the base material 2 (see FIG. 2).

The skin material 3 may include a woven fabric 6 and a cushion layer 7 stacked on the back surface of the woven fabric 6 (see FIG. 8). The material of the cushion layer 7 is not particularly limited, but a sheet material made of a soft polyurethane foam is often used. Other soft resin foams can also be used as long as they have sufficient cushioning properties.

The woven fabric 6 is a fabric woven by constituent yarns (warp yarns and weft yarns), and the weave structure thereof is not particularly limited. Specifically, for example, various weave structures such as plain weave, twill weave, and satin weave can be adopted. At least the optical fibers 5 are used as constituent yarns of the woven fabric 6. As the optical fiber 5, various optical fibers 5 having a core-sheath structure (multilayer structure) of a core (core layer) and a sheath (clad layer) and having different refractive indexes for the core layer and the clad layer can be adopted. The optical fiber 5 may be a side surface emission type optical fiber 5 in which light incident from one end side is emitted from a part of or all of the peripheral surface, or may be an end face emission type optical fiber 5 in which light incident from one end side is emitted from the other end side. In particular, when the side surface emission type optical fiber 5 is adopted, the designability and the presentation effect can be further enhanced because the light from a light source 9 can be emitted from the surface of the woven fabric 6 (i.e., the skin material 3) in which the optical fibers 5 are woven.

The optical fibers 5 are used for at least either warp yarns or weft yarns constituting the woven fabric, and in particular, may be in a form of being used for weft yarns. When the optical fibers 5 are used as the warp yarns, the proportion of the optical fibers 5 as the warp yarns is preferably greater than or equal to 10% and less than or equal to 90%, more preferably greater than or equal to 20% and less than or equal to 80%, and still more preferably greater than or equal to 30% and less than or equal to 70% when the number of all warp yarns is 100%. When the optical fibers 5 are used as the weft yarns, the proportion of the optical fibers as the weft yarns is preferably greater than or equal to 10% and less than or equal to 90%, more preferably greater than or equal to 20% and less than or equal to 80%, and still more preferably greater than or equal to 30% and less than or equal to 70% when the number of all weft yarns is 100%. The diameter of the optical fiber 5 is not particularly limited, but is preferably 0.25 to 3 mm and more preferably 0.1 to 1 mm from the viewpoint of weaving properties and versatility.

The type of constituent yarns (hereinafter, also referred to as "other constituent yarns") other than the optical fibers 5 constituting the woven fabric 6 is not particularly limited, but those made of plant-based and animal-based natural fibers, regenerated fibers such as rayon, semi-synthetic fibers such as acetate, synthetic fibers made of synthetic resin, or the like can be adopted. Examples of the resin constituting the synthetic fiber include polyamide resins such as nylon 6 and nylon 66, polyester resins such as polyethylene terephthalate, polybutylene terephthalate, and polytrimethylene terephthalate, polyolefin resins such as high density polyethylene and polypropylene, and polyacrylic resins.

In the other constituent yarns constituting the woven fabric 6, the same yarn may be used or different yarns may be used for the warp yarn and the weft yarn. In addition, only one type may be used or two or more types may be used in combination for the other constituent yarns used for the warp yarns. Similarly, only one type may be used or two or more types may be used in combination for the other constituent yarns used for the weft yarns. The fineness of the other constituent yarns is not particularly limited, but is, for example, preferably greater than or equal to 100 dtex and less than or equal to 1000 dtex, more preferably greater than or equal to 200 dtex and less than or equal to 700 dtex, and still more preferably greater than or equal to 300 dtex and less than or equal to 500 dtex.

Figure 11:
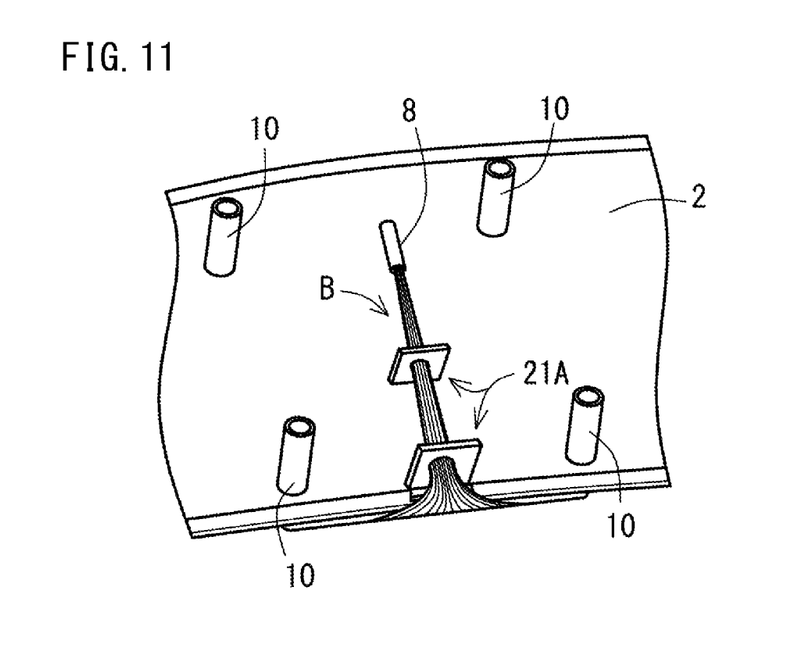
FIG. 11 is an explanatory view for explaining an ornament according to still another form.

The bundle structures 21A to 21C are structures for collecting the plurality of optical fibers 5 (i.e., the optical fiber bundle B) along the back surface of the base material 2. The bundle structures 21A to 21C may be subsequently attached to the back surface of the base material 2 separately from the base material 2, but are preferably integrally shaped (specifically, integrally molded) with the base material 2 from the viewpoint of reducing the number of parts and the like. In addition, the bundle structures 21A to 21C can be provided in a region within 20 mm (particularly 10 mm) from the outer edge of the base material 2. Furthermore, the bundle structures 21A to 21C may be provided only at the end portion of the back surface of the base material 2, or may be provided at a site separated away toward the inner side from the end portion of the back surface of the base material 2, in addition to the end portion of the back surface of the base material 2 (see FIG. 11).

Figure 4:
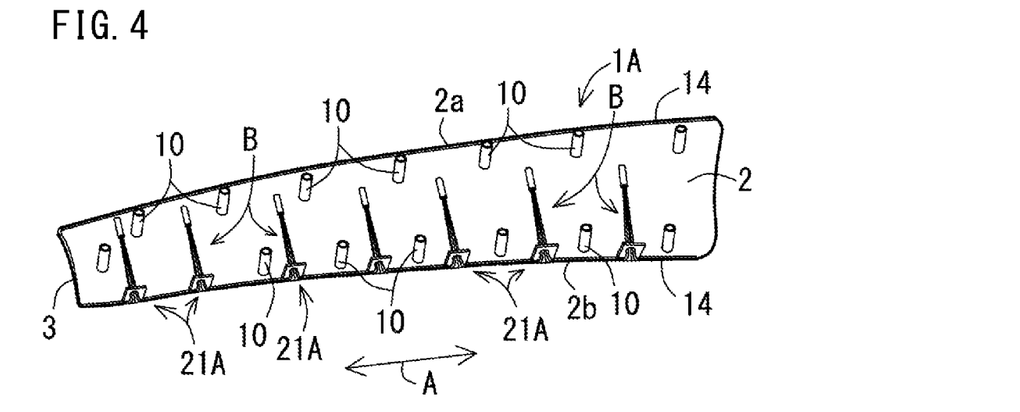
FIG. 4 is a perspective view of the ornament as viewed from the back surface.

The number of bundle structures 21A to 21C is not particularly limited, but a plurality of bundle structures can be provided along at least one side portion 2b of the base material 2 (see FIG. 4). Each of the plurality of bundle structures 21A to 21C can collect a predetermined number (e.g., 100 etc.) of optical fibers 5. Note that the number of optical fibers 5 collected by each of the bundle structures 21A to 21C may be the same or different in two or more bundle structures.

Figure 6:
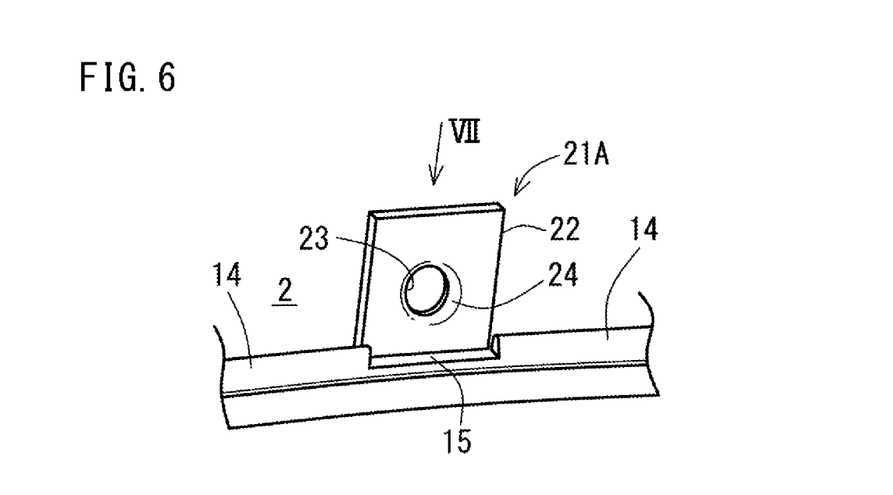
FIG. 6 is a perspective view of a bundle structure according to an example.

For example, as illustrated in FIGS. 5 and 6, the bundle structure 21A may have a standing wall 22 rising on the back surface of the base material 2, and the standing wall 22 may have an insertion hole 23 through which the plurality of optical fibers 5 (i.e., the optical fiber bundle B) can be inserted. In the bundle structure 21A, the optical fiber bundle B is inserted into the insertion hole 23 from the distal end side, and the root side B1 of the optical fiber bundle B (i.e., the vicinity side of the end portion of the skin material 3) is inserted into the insertion hole 23 and drawn, so that the optical fiber bundle B can be collected in a rope shape, a band shape, or the like to lie along the back surface of the base material 2.

Figure 7A:
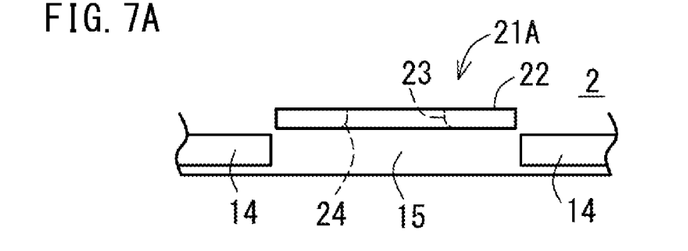
Figure 7B:
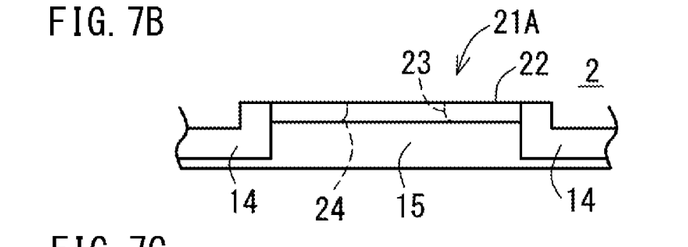
Figure 7C:
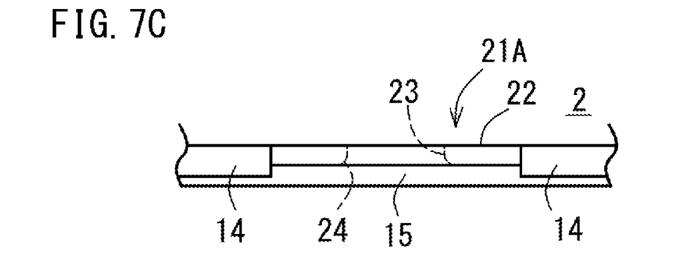

The standing wall 22 can be disposed so as to extend in a direction along the one side portion 2b of the base material 2. The standing wall 22 may be disposed away from the reinforcement rib 14 (see FIG. 7A), or may be disposed so as to be connected to the reinforcement rib 14 (see FIGS. 7B and 7C). Both side surfaces of the base portion of the standing wall 22 are connected to the reinforcement rib 14, so that the standing wall 22 can have a function of preventing deformation of the base material 2. Note that the reinforcement rib 14 may have a notch 15 formed at a position corresponding to the standing wall 22. The notch 15 is usually used as a space for the slide core forming the insertion hole 23.

Figure 9A:
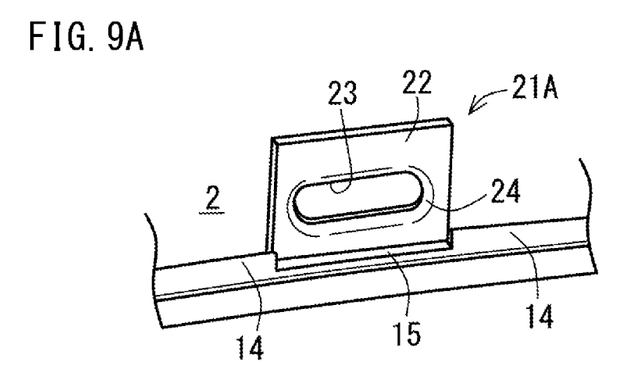
Figure 9B:
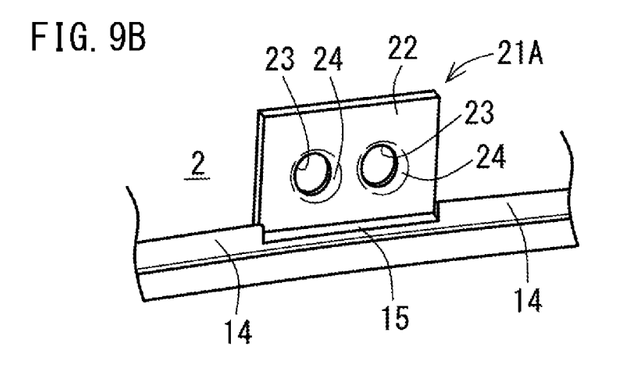

In the standing wall 22, one insertion hole 23 (e.g., a circular insertion hole 23) through which one optical fiber bundle B is inserted may be formed (see FIG. 6), one insertion hole 23 (e.g., a long hole-shaped or elliptical insertion hole 23) through which a plurality of optical fiber bundles B (particularly, two adjacent optical fiber bundles B) is inserted may be formed (see FIG. 9A), or a plurality of insertion holes 23 (e.g., a circular insertion hole 23) through which respective ones of a plurality of optical fiber bundles B (particularly, two adjacent optical fiber bundles B) are inserted may be formed (see FIG. 9B).

In the insertion hole 23, an R surface (i.e., a curved surface) 24 for guiding the insertion can be formed on the side where the distal end side of the optical fiber bundle B is inserted (see FIG. 2). The R surface 24 is usually formed over the entire circumference of the insertion hole 23. Furthermore, the shape of the insertion hole 23 is not particularly limited, and for example, a circular shape, a long hole shape, an elliptical shape, a polygonal shape, or the like can be adopted. Note that the shape for collecting the optical fiber bundle B (e.g., a rope shape, a belt shape, etc.) is determined by the shape, size, and the like of the insertion hole 23.

Figure 10A:
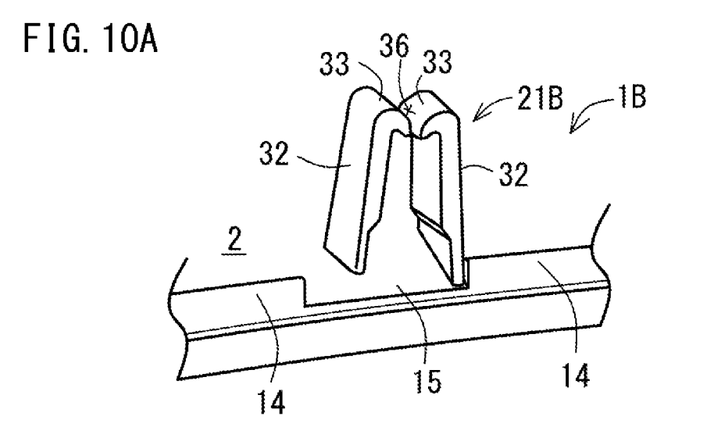
Figure 10B:
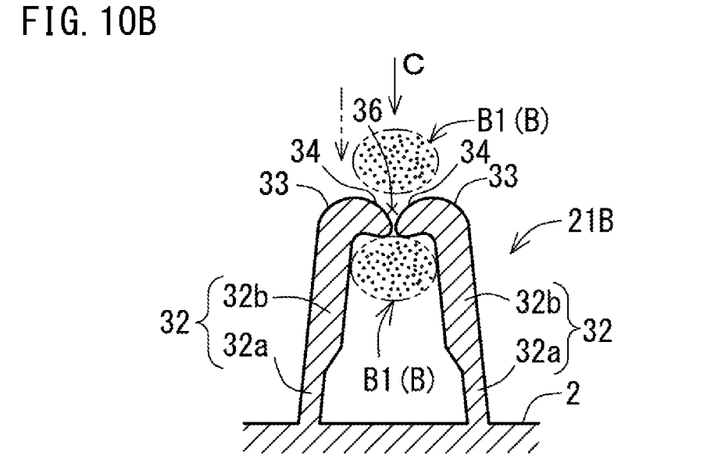
Figure 10C:
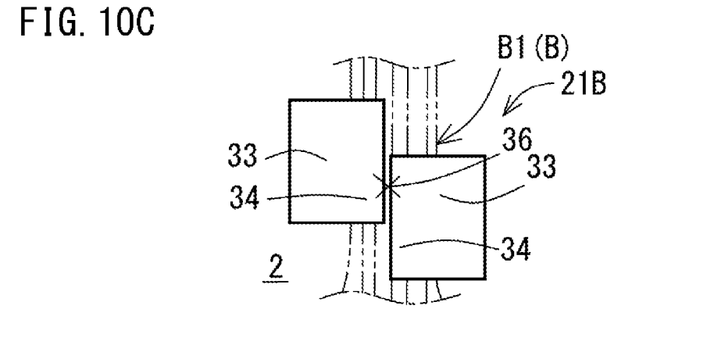

For example, as illustrated in FIGS. 10A to 10C, the bundle structure 21B may have a pair of standing walls 32 rising on the back surface of the base material 2 and facing each other, and a hook-shaped portion 33 capable of inserting a plurality of optical fibers 5 (i.e., the optical fiber bundle B) between the pair of standing walls 32 may be provided on a distal end side of each of the pair of standing walls 32. In the bundle structure 21B, the root side B1 of the optical fiber bundle B (i.e., the side in the vicinity of the end portion of the skin material 3) is inserted between the hook-shaped portions 33 from immediately above the hook-shaped portions 33, the pair of standing walls 32 is elastically deformed such that the hook-shaped portions 33 separate from each other, and the root side B1 of the optical fiber bundle B is inserted between the pair of standing walls 32 and drawn, whereby the optical fiber bundle B can be collected in a rope shape, a band shape, or the like so as to lie along the back surface of the base material 2. In the collecting state of the optical fiber bundle B, the exit of the optical fiber bundle B is suppressed by the hook-shaped portions 33. Furthermore, in the collecting state of the optical fiber bundle B, the root side B1 of the optical fiber bundle B may be disposed between the distal end portions of the pair of standing walls 32 in the rising direction, or may be disposed at the intermediate portion or the base portion in the rising direction of the pair of standing walls 32. Note that one optical fiber bundle B may be inserted between the pair of standing walls 32, or a plurality of optical fiber bundles B (particularly, two adjacent optical fiber bundles B) may be inserted therebetween.

Each of the pair of standing walls 32 may be formed to have the same thickness, but from the viewpoint of elastic deformability and the like, it is preferable to have a thin portion 32a continuous with the back surface of the base material 2 and a thick portion 32b having one end side continuous with the thin portion 32a and the other end side continuous with the hook-shaped portion 33. In addition, the pair of standing walls 32 may be arranged such that the positions in the direction orthogonal to the opposing direction of the standing walls 32 coincide with each other, but from the viewpoint of operability and the like in the case of elastic deformation by a fingertip operation, it is preferable that the positions in the direction orthogonal to the opposing direction of the standing walls 32 are shifted from each other (see FIG. 10O). In addition, the pair of standing walls 32 may be provided perpendicular to the back surface of the base material 2, but from the viewpoint of effectively collecting the optical fiber bundles B, and the like, it is preferable that the pair of standing walls are provided on the back surface of the base material 2 so as to approach each other toward the respective distal end portions. Furthermore, a curved surface 34 for guiding the insertion can be formed on the side where the optical fiber bundle B is inserted in each hook-shaped portion 32.

Figure 12:
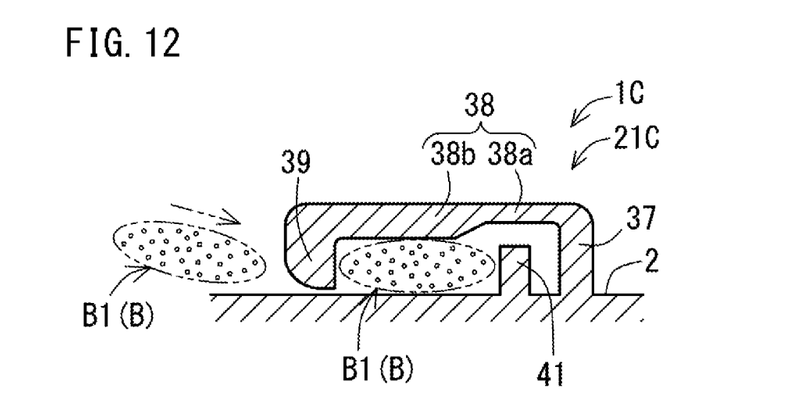
FIG. 12 is an explanatory view for explaining an ornament according to still another form.

For example, as illustrated in FIG. 12, the bundle structure 21C can include a standing wall 37 rising on the back surface of the base material 2, a lateral wall 38 extending laterally from the distal end side of the standing wall 37, and a hook-shaped portion 39 provided on the distal end side of the lateral wall 38. In the bundle structure 21C, the root side B1 of the optical fiber bundle B (i.e., the side in the vicinity of the end portion of the skin material 3) is inserted from the side of the hook-shaped portion 39, the lateral wall 38 is elastically deformed so that the hook-shaped portion 39 separates away from the back surface of the base material 2, and the root side B1 of the optical fiber bundle B is inserted between the lateral wall 38 and the back surface of the base material 2 and drawn, whereby the optical fiber bundle B can be collected in a rope shape, a band shape, or the like so as to lie along the back surface of the base material 2. In the collecting state of the optical fiber bundle B, the exit of the optical fiber bundle B is suppressed by each hook-shaped portion 39.

The lateral walls 38 may be formed to have the same thickness, but from the viewpoint of elastic deformability and the like, it is preferable to have a thin portion 38a continuous with the standing wall 37 and a thick portion 38b having one end side continuous with the thin portion 38a and the other end side continuous with the hook-shaped portion 39. Furthermore, a restriction piece 41 for restricting lateral spreading of the optical fiber bundle B may be provided on the back surface of the base material 2.

The application of the present interior material is not particularly limited. Examples of the present interior material include vehicle interior materials constituting interior products such as a door trim, an instrument panel, a roof trim, a floor trim, a luggage trim, a rear side trim, a rear parcel, a package tray, a pillar garnish, a switch base, a quarter panel, an arm rest, a center console, an overhead console, a sun visor, and a seat for vehicles. Furthermore, it may be an interior material constituting furniture such as a sofa or a chair.

Examples

Hereinafter, the present invention will be specifically described by way of examples with reference to the drawings. In the present example, an ornament 1A constituting a vehicle door trim 41 is exemplified as the "interior material" according to the present invention.

As illustrated in FIGS. 1 to 3, the vehicle door trim 41 includes a trim main body 42 that has a plate shape and covers a metal inner panel (not illustrated) from a vehicle compartment interior side. The trim main body 42 includes the ornament 1A forming a design surface on the vehicle compartment interior side, an upper board 44, and a lower board 45.

The ornament 1A according to the present example includes a base material 2 having a plate shape and a skin material 3 covering a front surface of the base material 2. The ornament 1A is disposed between the upper board 44 and the lower board 45 in the vertical direction. In addition, the lower end portion of the upper board 44 is abutted with the surface (i.e., the design surface) of the upper end portion of the front surface of the ornament 1A, and a parting D1 in the design of the ornament 1A is formed by this abutment site. Furthermore, the upper end portion of the lower board 45 is abutted with the surface (i.e., the design surface) of the lower end portion of the front surface of the ornament 1A, and a parting D2 in the design of the ornament 1A is formed by this abutment site. Note that a base member 43 constituting the door trim 4 is disposed so as to face the back surface of the ornament 1A (see FIG. 3).

The base material 2 is formed in a long shape (specifically, a long quadrangular shape) in the vehicle front-rear direction A (see FIG. 4). A fastening portion 10 (specifically, a fastening boss) to be fastened to the base member 43 is provided on the back surface of the base material 2. A plurality of the fastening portions 10 are provided along an upper side portion 2a and a lower side portion 2b of the base material 2. Furthermore, the fastening portion 10 and an attachment portion 19 provided on the base member 43 are fastened by a bis 12 (see FIG. 3). In addition, on the back surface of the base material 2, a reinforcement rib 14 for preventing deformation of the base material linearly extending along the upper side portion 2a and the lower side portion 2b is provided in a protruding manner.

The skin material 3 is formed in a long shape (specifically, a long quadrangular shape) in the vehicle front-rear direction A. The skin material 3 includes a woven fabric 6 in which side surface emission type optical fibers 5 are woven as constituent yarns, and a cushion layer 7 stacked on the back surface of the woven fabric 6 (see FIG. 8). In addition, a plurality of optical fibers 5 are exposed from the end portion of the skin material 3. The distal end sides of the plurality of optical fibers 5 are bound by a sleeve 8 or the like to font an optical fiber bundle B. A plurality of (seven in FIG. 4) optical fiber bundles B are provided along a lower side portion 3b of the skin material 3. Furthermore, in a state where the skin material 3 is attached to the front surface of the base material 2, the end portion (specifically, the lower side portion 3b) of the skin material 3 continuous with the optical fiber bundle B is not folded back to the back surface side of the base material 2, and is disposed at the end portion of the front surface of the base material 2 (see FIG. 2).

Note that light from a light source 9 such as an LED is made incident on the distal end side of the optical fiber bundle B (i.e., the binding side by the sleeve 8 etc.) (see FIG. 8). As a result, the light from the light source 9 exits from the surface of the skin material 3, thus further enhancing the designability and the presentation effect. Note that the light source 9 is held by a holding portion (not illustrated) provided on the back surface of the base material 2.

As illustrated in FIG. 4, a bundle structure 21A that collects the optical fiber bundle B exposed from the end portion of the skin material 3 along the back surface of the base material 2 is provided at the end portion of the back surface of the base material 2. A plurality of (seven in FIG. 4) bundle structures 21A are provided along the lower side portion 2b of the base material 2.

As illustrated in FIGS. 5 and 6, the bundle structure 21A has a rectangular standing wall 22 rising on the back surface of the base material 2. A circular insertion hole 23 through which the optical fiber bundle B can be inserted is formed in the standing wall 22.

The standing wall 22 is disposed so as to extend in a direction along the one side portion 2b of the base material 2. The standing wall 22 is disposed away from the reinforcement rib 14 provided on the lower side portion 2b of the base material 2 (see FIG. 7A).

The insertion hole 23 has an outer diameter (e.g., 7 mm) larger than the outer diameter (e.g., 5 mm) of the sleeve 8. In the insertion hole 23, an R surface (i.e., a curved surface) 24 for guiding the insertion is formed on the side where the distal end side of the optical fiber bundle B is inserted (see FIG. 2). The R surface 24 is formed over the entire circumference of the insertion hole 23.

Next, the operation and effect of the ornament 1A having the above configuration will be described. When the skin material 3 is attached to the front surface of the base material 2, a rake-shaped optical fiber bundle B (see FIG. 8) exposed from the end portion of the skin material 3 is folded back to the back surface side of the base material 2, and the distal end side thereof is inserted into the insertion hole 23 to insert the root side B1 of the optical fiber bundle B is inserted into the insertion hole 23. As a result, the optical fiber bundle B is collected in a rope shape so that the root side B1 is drawn and extended along the back surface of the base material 2 (see FIG. 5).

According to the ornament 1A of the present example, the skin material 3 has the woven fabric 6 in which the optical fibers 5 are woven as constituent yarns, and the bundle structure 21A for collecting the plurality of optical fibers 5 exposed from the end portion of the skin material 3 so as to lie along the back surface of the base material 2 is provided at the end portion of the back surface of the base material 2. As a result, the fastening portion 10 with the base member 43 constituting the door trim 41 can be set on the side closer to the outer edge of the back surface of the base material 2 and can be brought close to the parting D2 in the design.

Furthermore, in the present example, the bundle structure 21A includes the standing wall 22, and the standing wall 22 has the insertion hole 23 formed therein. Thus, the plurality of optical fibers 5 can be easily collected by being inserted into the insertion hole 23.

Furthermore, in the present example, a plurality of bundle structures 21A are provided along the lower side portion 2b of the base material 2. As a result, the plurality of optical fibers 5 exposed from the end portion of the skin material 3 can be divided into a predetermined number and collected by each bundle structure 21A.

Next, an ornament 1B according to another form will be described, but the same reference numerals are given to substantially the same constituent parts as those of the ornament 1A, and the detailed description thereof will be omitted.

The present ornament 1B includes a bundle structure 21B instead of the bundle structure 21A. As illustrated in FIGS. 10A to 10C, the bundle structure 21B has a pair of standing walls 32 rising on the back surface of the base material 2 and facing each other. A hook-shaped portion 33 forming an insertion port 36 capable of inserting the root side B1 of the optical fiber bundle B between the pair of standing walls 32 is provided on a distal end side of each of the pair of standing walls 32.

Each of the pair of standing walls 32 has a thin portion 32a continuous with the back surface of the base material 2, and a thick portion 32b having one end side continuous with the thin portion 32a and the other end side continuous with the hook-shaped portion 33. In addition, the pair of standing walls 32 is disposed with their positions in a direction orthogonal to the opposing direction of the standing walls 32 shifted. Furthermore, the pair of standing walls 32 is provided on the back surface of the base material 2 so as to approach each other toward the distal end side. Furthermore, a curved surface 34 for guiding the insertion is formed on the side where the root side B1 of the optical fiber bundle B is inserted in each hook-shaped portion 33.

In the present bundle structure 21B, the root side B1 of the optical fiber bundle B is inserted between the hook-shaped portions 33 from immediately above the hook-shaped portions 33 and is inserted between the pair of standing walls 32 and drawn while separating each of the hook-shaped portions 33 from each other by a fingertip operation, whereby the optical fiber bundle B is collected in a rope shape so as to lie along the back surface of the base material 2. In the collecting state, the exit of the optical fiber bundle B is suppressed by the hook-shaped portions 33. Note that the insertion of the optical fiber bundle B between the pair of standing walls 32 may be performed without separating the hook-shaped portions 33 from each other by a fingertip operation.

According to the present ornament 1B, substantially the same operation effects as those of the ornament 1A are obtained, and as the bundle structure 21B has the pair of standing walls 32 and the hook-shaped portion 33 is provided on a distal end side of each of the pair of standing walls 32, the plurality of optical fibers 5 can be easily collected by being inserted to between the pair of standing walls 32 from the hook-shaped portions 33. Furthermore, the hook-shaped portions 33 prevent the plurality of optical fibers 5 inserted between the pair of standing walls 32 from coming out.

Note that the present invention is not limited to the above examples, and various modifications can be made within the scope of the present invention depending on the purpose and use. That is, in the above examples, the ornaments 1A, 1B in which the plurality of optical fiber bundles B are provided along the lower side portion 3b of the skin material 3 and the plurality of bundle structures 21A, 21B are provided along the lower side portion 2b of the base material 2 have been exemplified, but the present invention is not limited thereto, and for example, ornaments 1A, 1B in which the plurality of optical fiber bundles B are provided along the upper side portion 3a of the skin material 3 and the plurality of bundle structures 21A, 21B are provided along the upper side portion 2a of the base material 2 may be adopted. Furthermore, ornaments 1A, 1B in which a plurality of optical fiber bundles B are provided along the upper side portion 3a and the lower side portion 3b of the skin material 3, and a plurality of bundle structures 21A, 21B are provided along the upper side portion 2a and the lower side portion 2b of the base material 2 may be adopted.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is widely used as a technique for collecting a plurality of optical fibers exposed from an end portion of a skin material at an end portion of a back surface of a base material.

The invention claimed is:

1. An interior material comprising a base material having a plate shape and a skin material covering a front surface of the base material, characterized in that
   the skin material has a woven fabric in which optical fibers are woven as constituent yarns, and
   a bundle structure that collects the plurality of optical fibers exposed from an end portion of the skin material along a back surface of the base material is provided at an end portion of the back surface of the base material.

2. The interior material according to claim 1, wherein
   the bundle structure has a standing wall rising on the back surface of the base material, and
   an insertion hole through which the plurality of optical fibers are inserted is formed in the standing wall.

3. The interior material according to claim 1, wherein
   the bundle structure includes a pair of standing walls rising on the back surface of the base material and facing each other, and
   a hook-shaped portion that inserts the plurality of optical fibers between the pair of standing walls is provided on a distal end side of each of the pair of standing walls.

4. The interior material according to claim 1, wherein a plurality of the bundle structures are provided along at least one side portion of the base material.

5. The interior material according to claim 1, wherein the interior material being an ornament constituting a vehicle door trim.

* * * * *